E. M. STERNBERG.
PULP WOOD FILLER FOR VEHICLE FRAMES.
APPLICATION FILED FEB. 9, 1920.
1,405,637.
Patented Feb. 7, 1922.
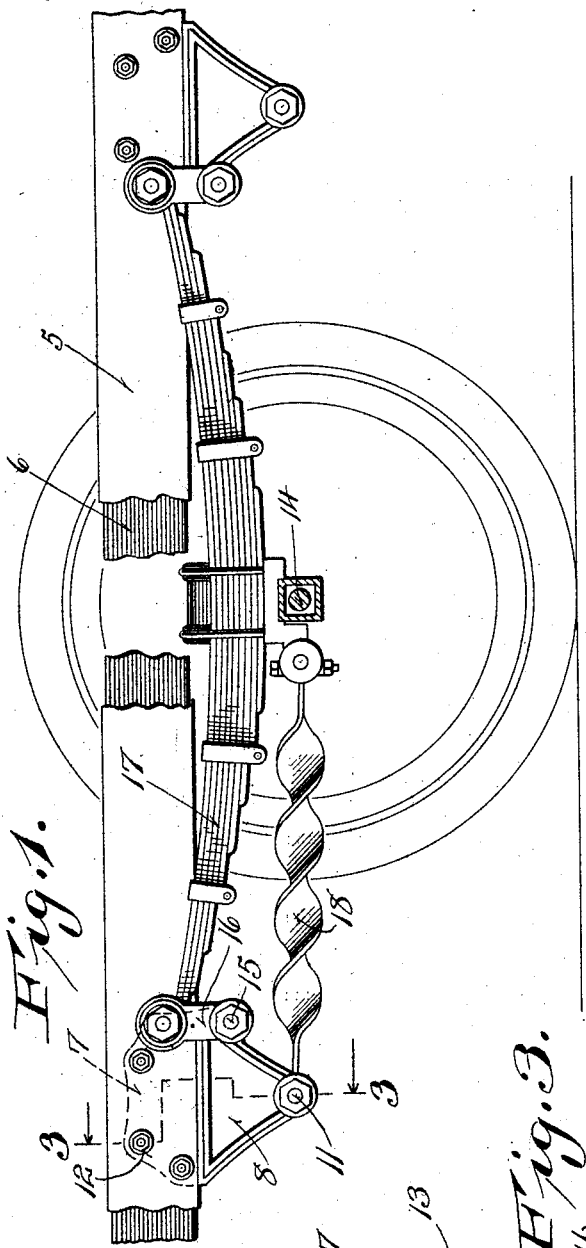
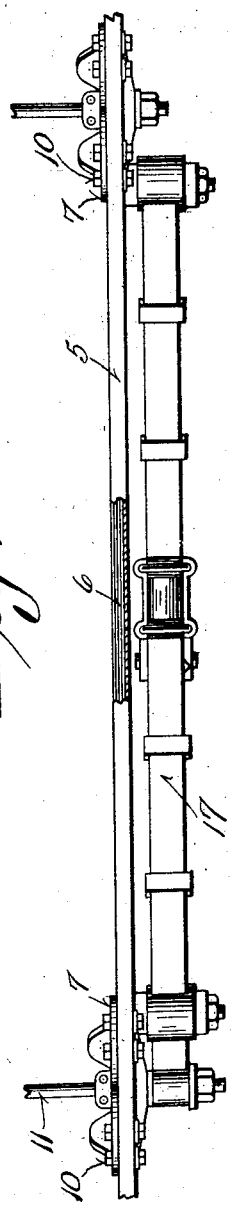
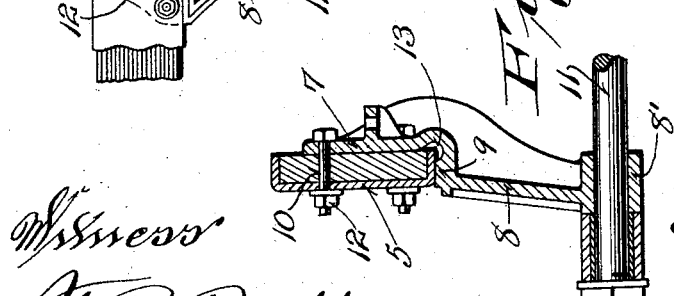
Inventor
E. M. Sternberg

UNITED STATES PATENT OFFICE.

ERNST M. STERNBERG, OF WEST ALLIS, WISCONSIN.

PULP-WOOD FILLER FOR VEHICLE FRAMES.

1,405,637.  Specification of Letters Patent.  Patented Feb. 7, 1922.

Application filed February 9, 1920. Serial No. 357,310.

*To all whom it may concern:*

Be it known that I, ERNST M. STERNBERG, a citizen of the United States, and resident of West Allis, in the county of Milwaukee and State of Wisconsin, have invented certain new and useful Improvements in Pulp-Wood Fillers for Vehicle Frames; and I do hereby declare that the following is a full, clear, and exact description thereof.

My invention relates to new and useful improvements in vehicle frames more particularly of that type used on trucks or other motor vehicles wherein considerable vibration and relatively heavy load stresses are encountered.

It is in general the object of my invention to simplify and strengthen the structure of this type of vehicle frames, as well as to provide for an increased durability of the various connections of the frame and associated parts.

A further and important object resides in the provision of a frame structure wherein the vibrations which are set up incidental to travel of the vehicle are absorbed in such manner as to relieve the strain upon the connecting members associated with the frame and to eliminate noise emanating from the frame structure in travel of the vehicle. It is more particularly my object to provide a cushioning arrangement associated with the frame structure whereby the vibration set up by operation of the propelling mechanism and the vibrations set up in the running gear incidental to travel of the vehicle are absorbed by cushioning means.

A still further object resides in the provision of a frame structure wherein bolts and nuts may be substituted for the usual connecting rivets heretofore provided to thus facilitate the repair and replacement of parts, and wherein means is provided for preventing unthreading movement of the nuts of said bolts incidental to vibrations.

A still further object resides in the provision of an improved means for connecting the running gear and frame cross members with the side sills of the frame.

With the above and other objects and advantages in view, which will be apparent as the description proceeds, my invention resides in the novel features of construction, combination and arrangement of the parts as hereinafter described and defined by the appended claims.

In the accompanying drawings:

Figure 1 is a side elevational view of a portion of the frame and running gear of an automobile vehicle constructed in accordance with my invention, the side frame sill being broken away in places.

Figure 2 is a plan view of what is shown in Figure 1, and

Figure 3 is a transverse sectional view on the plane indicated by the line 3—3 of Figure 1.

Referring now more particularly to the accompanying drawings, 5 designates one of the side sills of the vehicle frame, all of the sills being similar in nature and each formed of a channel metallic beam having its top and bottom flanges directed inwardly of the frame. A filler beam 6 of wood or other material capable of slight compression to procure a cushioning action is disposed within the channel of the beam 5, the inner face of this filler beam 6 being flush with the edges of the flanges of the beam 5.

In attaching members to the frame sill, said members are engaged against the inner side of the sill, in contact relation to the filler beam 6, and bolts are passed through the said member, through the filler beam and through the wall of the channel beam whereby a cushioning action is afforded by the filler beam between the attaching member and the metallic beam 5, and whereby other decided advantages are procured as will be later explained.

In the present structure the running gear and adjacent cross members of the vehicle frame are secured to hanger bracket members connected with the side sills in the manner just described. Each of these hanger brackets comprises a plate casting having upper and lower offset sections 7 and 8 respectively connected by a shoulder portion 9, the lower section 8 being triangular in shape and having a bearing sleeve 8' formed at its lower end and adapted to receive a cross bar 11 of the frame. The upper section 7 of the bracket is engaged against the inner face of the filler beam and secured by bolts 10 passed therethrough and through the filler beam and through the vertical section of the channel beam 5, these bolts being secured to the usual nuts 12 on their ends. The shoulder 9 engages against the bottom flange of the channel beam, and the bracket is cut away at the juncture of its upper section 7 and shoulder 9 whereby to permit movement of the bracket member transversely with respect to the sill in cushioning action of the filler beam thereof.

Two of these hanger brackets are secured to each side sill for connection of the rear axle 14, and said brackets are provided with outwardly projecting bearing members 15 on their portions 8 on which are mounted the lower ends of a pair of shackle links 16 which have their upper ends pivotally connected with the ends of the adjacent rear axle spring 17. A radius rod 18 is provided having its ends secured respectively to the axle 14 and to the vehicle bracket member, preferably by mounting the end of the radius rod on the transverse frame bar 11.

I have thus provided an exceedingly simple, strong and durable mounting for the rear axle of a vehicle of the present type, wherein it will be primarily noted that the vibration of the vehicle body and propelling mechanism are cushioned by the filler beam 10 as are also the vibrations of the running gear, thus preventing crystillization and fatigue of the metallic frame and connecting parts by the combined action of the series of vibrations it being noted that while the hanger bracket members are in engagement with the base flange of the channel beam 5 this engagement is not of such nature as to procure objectionable transmission vibrations since the positive securement of the hanger brackets of the side sill is affected through the upper portions 7 of the hanger brackets, which are cushioned against the filler beam 6.

The filler beam 6 permits use of simple bolts for securing braces or other members to the frame sill, thus eliminating the necessity of using rivets and gussets, and avoiding the provision of apertures in the flange portions of the channel beam for the reception of securing member, and procuring a much stronger structure since the bolts extend through the vertical section of the channel beam, and it is well recognized that apertures in the vertical section of the channel beam do not materially affect the strength of the beam, as do apertures in the flange portions of the beam.

While I have shown and described a preferred embodiment of my invention, it will be appreciated that various changes and modifications of structure may be employed to meet differing conditions of use and manufacture, without departing in any manner from the spirit of my invention.

What is claimed is:

1. In a vehicle frame structure, the combination of a longitudinally channeled metallic sill beam, a wooden beam filling the space between the sides of the channel beam, a bracket member engaged against said wooden beam and having a portion extending laterally thereof, and securing bolts passed through the wooden and metallic beams and through the connecting member, said laterally extending portion having a shoulder in abutting relation to the outer side of said channel beam.

2. In a vehicle frame structure the combination of a channeled metallic sill beam, a wooden beam disposed in the channel of the metallic beam and a connecting bracket having its upper portion engaged against the wooden beam and having its lower portion extending under the metallic beam and engageable therewith and bolts passed through the wooden and metallic beams and through the upper portion of said connecting bracket.

3. In a vehicle frame structure the combination of a channeled metallic sill beam, a wooden beam disposed in the channel of the metallic beam, a connecting bracket comprising upper and lower offset portions connected by a shoulder portion, said shoulder portion being engaged against the bottom of the metallic beam, said upper portion being engaged against the wooden beam and bolts passed through said wooden and metallic beams and through the upper portion of the bracket.

In testimony that I claim the foregoing I have hereunto set my hand at West Allis, in the county of Milwaukee and State of Wisconsin.

E. M. STERNBERG.